United States Patent

Rodger et al.

[15] 3,635,800

[45] Jan. 18, 1972

[54] TRANSFER OF LIQUID AS VAPOR BETWEEN BODIES OF LIQUID WITH DIFFERENT CURVATURES AND ASSOCIATED VAPOR PRESSURES

[72] Inventors: Franklin A. Rodger; Edward M. Purcell, both of Cambridge, Mass.

[73] Assignee: Pactide Corporation, Cambridge, Mass.

[22] Filed: Mar. 23, 1970

[21] Appl. No.: 21,877

Related U.S. Application Data

[63] Continuation-in-part of Ser. No. 631,523, Apr. 17, 1967, abandoned, Continuation-in-part of Ser. No. 256,407, Feb. 5, 1963, abandoned.

[52] U.S. Cl. ..............203/10, 203/49, 203/100, 202/199, 202/236, 252/359
[51] Int. Cl. .....................B01d 3/00, B01d 3/14, B01d 3/34, B01d 3/08, B01d, B01f
[58] Field of Search ..........159/1, DIG. 17; 23/312 W, 270.5, 23/306, 310; 203/10, 11, 49, 100, 100 DC, 49, 90; 210/21, 22; 202/236, 199; 252/359

[56] References Cited

UNITED STATES PATENTS 3,350,300  10/1967  Hess et al..................................210/22

*Primary Examiner*—Norman Yudkoff
*Assistant Examiner*—J. Sofer
*Attorney*—Brown and Mikulka and Robert E. Corb

[57] ABSTRACT

A liquid transfer system is disclosed, particularly applicable to the desalination of water, in which a solution, e.g., saline water, is formed into fine droplets having a specified curvature and associated vapor pressure dispersed in a carrier fluid immiscible with the solvent to form a disperse system which is then brought into intimate association with a body of solvent of lower solute concentration and having a smaller curvature and lower associated vapor pressure creating an unstable condition in which solvent transfers as vapor from the droplets of the disperse system to the body of solvent. Examples are given in which the disperse system is an aerosol, i.e., carrier fluid is a gas, or an emulsion, i.e., carrier fluid is a liquid.

16 Claims, 3 Drawing Figures

TRANSFER OF LIQUID AS VAPOR BETWEEN BODIES OF LIQUID WITH DIFFERENT CURVATURES AND ASSOCIATED VAPOR PRESSURES

This application is a continuation-in-part of application, Ser. No. 631,523, filed Apr. 17, 1967, now abandoned, in turn a continuation-in-part of Ser. No. 256,407 filed Feb. 5, 1963, now abandoned.

This application discloses method and apparatus in which a volatile liquid is transferred as a vapor from one body of liquid to another and having particular utility in the desalination of water. The process involves the formation of a disperse system comprising fine droplets of a solution, such as saline water, including a volatile solvent and a nonvolatile solute suspended in a continuous phase or carrier fluid in which the droplets and carrier fluid are in equilibrium. The disperse system is brought into association with a reservoir of the solvent, such as fresh water, having a smaller curvature and associated vapor pressure to create an unstable condition in which the solvent is transferred as a vapor via the carrier fluid from the disperse phase to the solvent reservoir tending to reestablish an equilibrium condition. The driving force is the energy transferred to the droplets to achieve their formation and processes are described in which the disperse system is an aerosol and in which the disperse system is an emulsion.

This invention relates to novel methods of transferring volatile liquids from one liquid body to another, and more particularly to methods involving liquid-vapor transitions, useful in recovery, separation and/or purification of liquids.

The invention has, as an object, a novel and improved liquid transfer process for purifying liquids and/or the recovering or separating a liquid from a liquid body, particularly a solution, including the same.

Another object of the invention is to provide a novel liquid transfer process involving a liquid-vapor transition.

A number of liquid recovery procedures based on liquid-vapor transitions are known in the art. These procedures, notably distillation or evaporation processes, are each in turn based on heat exchange techniques involving the initial commitment of relatively large amounts of heat energy followed by more or less successful attempts to recover most of the heat energy initially committed, i.e., the initial energy committed less irreversibly transferred energy and reversible work performed. The overall efficiency of such a system is determined by the irreversible losses during energy recovery. For example, the desalination of sea water (approximately 3.5 percent salt) by conventional evaporation processes involves an energy commitment of the order of 1,000 B.t.u. per pound of product (fresh water), whereas the initial and final states are reversibly separated by an energy difference of the order of 1 B.t.u. per pound of product; and thus any inefficiency in the intermediate process, including energy input and recovery, is multiplied by a factor of the order of 1,000.

A further object of the invention is to provide a substantially more efficient liquid transfer process as described in which the energy commitment more closely approaches the reversible difference between the energy levels of initial and final states.

In conventional liquid-vapor transition processes and the process of the invention, liquid transport from a first body or reservoir, such as a solution containing the liquid, to another body or reservoir of the liquid can be said to depend upon the existence of a vapor pressure differential between reservoirs. In conventional processes, this vapor pressure differential is the result of a temperature differential requiring the initial and continuing input of heat energy into the reservoir from which liquid is to be transferred.

Still other objects of the invention are: to provide a liquid transfer process as described in which the energy input is in the form of a mechanical energy; and specifically, a method in which the liquid body from which liquid is to be extracted is formed into a disperse system comprising fine droplets having an associated vapor pressure and curvature greater than the vapor pressure and curvature associated with a reservoir to which liquid is to be transferred; to provide a method as described in which a disperse system is formed comprising droplets having an associated vapor pressure greater than the vapor pressure associated with a reservoir of a liquid and carried in a fluid saturated with the vapor of the liquid and is brought into association with the reservoir of said liquid and the vapor pressure associated with the droplets is reduced toward equilibrium with the vapor pressure associated with the reservoir by transferring said liquid as vapor from said droplets via the carrier fluid to said reservoir; to provide a process as described in which the carrier fluid is gaseous; and to provide a process as described in which the carrier fluid is a liquid immiscible with the liquid transferred.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
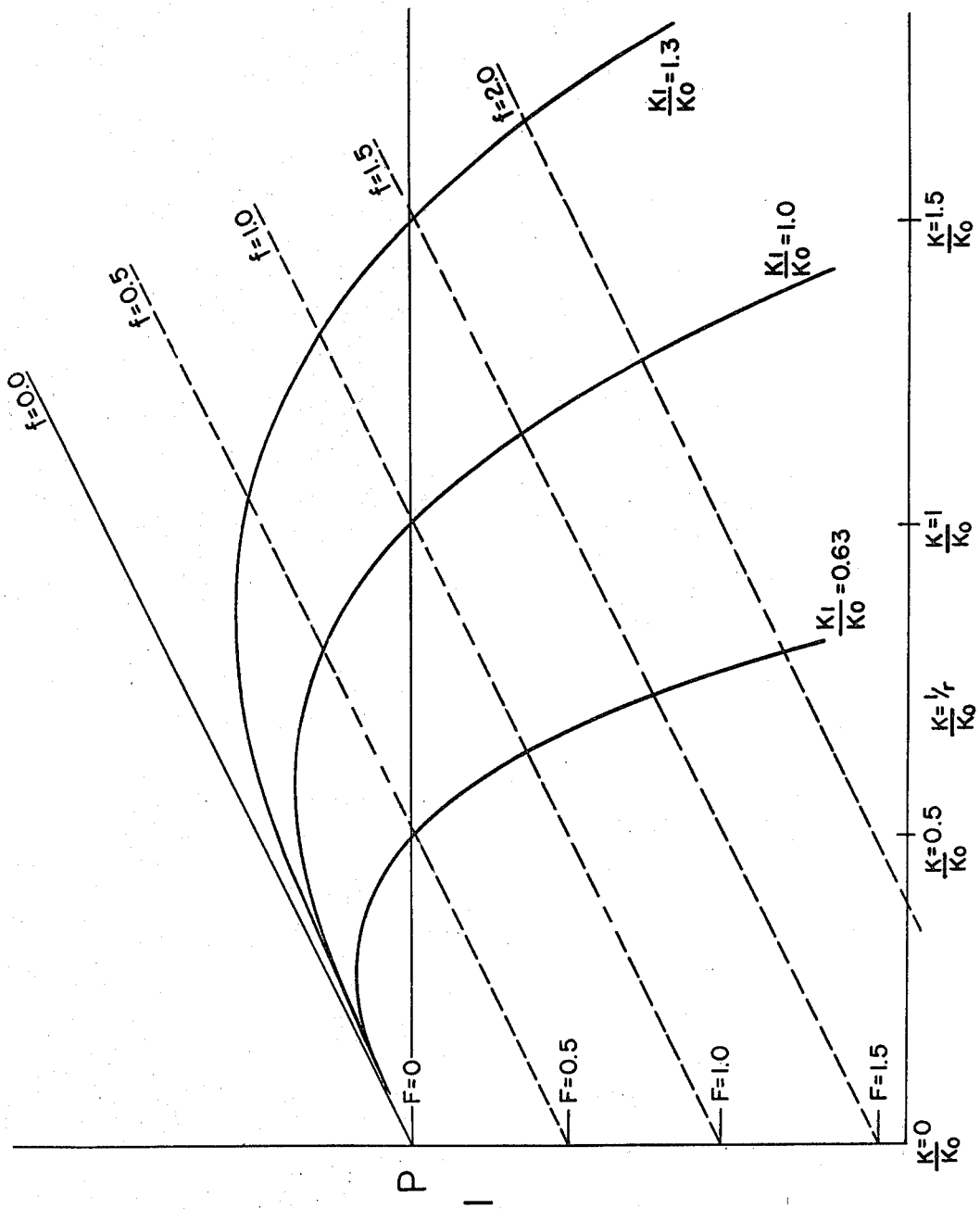
FIG. 1 is a graphical representation of the method of the invention in which the ordinate represents vapor pressure and the abscissa is proportional to droplet curvature.

The liquid transfer method of the invention finds utility in substantially any procedure in which it is desired to transfer a volatile liquid from one liquid body (e.g., solution, emulsion and/or dispersion) to another liquid body including the volatile liquid. The expression "volatile liquid" is employed herein in its broadest sense to mean and include any liquid having a significant vapor pressure, with the result that the invention has a large number of applications including, for example: purification of liquid bodies, such as water, by the separation of solutes and/or suspended material from the solvent and/or liquid phase; extraction of solvents from solutions; concentration of bulk liquids (including solutions, emulsions and/or dispersions such as milk and fruit juices; and the separation of liquid fractions such as comprise petroleum. The process does not require the transfer of heat to or from the body of liquid from which liquid transfer is effected, in order to maintain a temperature differential, and this is a particular advantage in applications in which heat may have a harmful effect on the liquid, solute and/or dispersed material. The invention is also applicable to the transfer of liquids which are not liquids at ordinary temperatures, in which case heat is added or extracted solely for the purpose of liquefying the materials involved and not to achieve liquid transfer.

As indicated previously, the liquid transfer procedure of the invention operates on the basis of a vapor pressure differential resulting in liquid-vapor-liquid transition and differs from conventional evaporative processes by virtue of the fact that the energy committed to create the vapor pressure differential is put into the bulk liquid in the form of mechanical rather than heat energy. The vastly improved efficiencies accruing from this innovation together with such considerations as apparatus cost make the application of the process to water purification, particularly desalination, very attractive economically. In view of the special adaptability of the invention to water desalination, the process will be considered with special reference to the separation of volatile solvents, particularly water, from nonvolatile solutes, particularly inorganic salts, in ionic solutions, e.g., sea water.

Basically, the method of the invention involves the generation of a disperse system which may be defined as a "heterogeneous system consisting of more than one phase."[1]

[1] *The International Dictionary of Physics and Electronics*, p. 834, D. Van Nostrand Company, Inc., 1956.

This disperse system may take the form of an aerosol comprising droplets of liquid, e.g., solution, from which a volatile liquid is to be transferred, suspended in a gaseous carrier fluid including the saturated vapor of the volatile liquid; or an emulsion comprising solution droplets suspended in an immiscible liquid carrier fluid. The droplets of the dispersed phase are generated so as to exhibit a vapor pressure greater than a vapor pressure associated with a reservoir including the volatile liquid and to which the volatile liquid is to be transferred. The disperse system, i.e., aerosol or emulsion, is in equilibrium and is brought into physical association with the reservoir, e.g., solvent with lower solute concentration, thereby creating an unstable condition in which the disperse system gives up the volatile liquid (solvent) to the reservoir while vapor is transferred from the droplets to the disperse medium tending to bring the disperse system and reservoir into equilibrium, that is, to reduce the vapor pressure of the dispersed droplets toward equilibrium with the reservoir. The disperse system is then separated from the reservoir whereafter the dispersed phase may, if desired, be separated from the dispersion medium. The product of such a system may comprise either or both the volatile liquid (solvent) transferred to the reservoir and a concentrated solution of the solute or dispersed material remaining in the dispersed droplets.

The method of the invention represents the unique application of certain well-known physical phenomena. It is known (see for example: La Mer, V. K. and Green, R., Trans. Faraday Soc. 48, 410 (52); Condon and Odishaw, *Handbook of Physics*, pp. 5 -95, McGraw Hill, 1961) that the equilibrium vapor pressure of a volatile liquid is dependent, among other factors, on the radius of curvature of the phase interface, that is the liquid-vapor interface in the case of an aerosol, or the liquid-liquid (immiscible) interface in the case of an emulsion, and is taken as positive when the interface is convex, as viewed from the dispersion medium or fluid carrier phase. The change in vapor pressure, P, of a droplet of saline solution with respect to the vapor pressure, P, of a large reservoir of pure water at the same temperature which results from droplet curvature, $K=1/r$, is given by the expression $$\Delta P/P \simeq 2M\gamma/\rho RT) K \quad (1)$$

in which $M$ is molecular weight, $\gamma$ is surface tension, $R$ is the universal gas constant, $T$ is absolute temperature, and $\rho$ is the density of the liquid.

The vapor pressure of a droplet is depressed linearly with fluid (nonvolatile) concentration and the change of vapor pressure is given by the expression $$\frac{\Delta P}{P} \simeq -\frac{T_{bpe}}{P} \frac{\partial P}{\partial T} \left(\frac{K}{K_1}\right)^3 \quad (2)$$

in which a standard salinity is assumed, namely, the salinity of sea water (3.5 percent) at which the boiling point elevation at ambient temperature is $T_{bpe}$ (0.64° F. for sea water at 86° F.). The vapor pressure depression for standard salinity and ambient temperature is similarly $\Delta T_{bpe}$ $(\partial P/\partial T)$ while at the arbitrary salinity it is $\Delta T_{bpe} (\partial P/\partial T)f$ in which $f$ is the salinity relative to the standard. But $f=(4/3 \pi r_1^3)/(4/3 \pi r^3)$ in which $r_1$ is the radius of curvature at which radius the relative salinity of the droplet is unity. Thus, $F=(K/K_1)$. $K_1$ can be interpreted as the initial curvature provided only that the droplet is formed initially from standard sea water $K_0$ is defined by the relation $$K_0 = \left(\frac{T_{bpe}}{P} \frac{\partial P}{\partial T}\right) \frac{RT\rho}{2M\nu}$$

in which case $K_0$ is a curvature which characterizes, not a given droplet or even necessarily the liquid from which the droplet was formed, but rather, the standard solution used to define the reference salinity. Using $K_0$, equations 1 and 2 can be combined and rewritten in the dimensionless for $$\frac{(\Delta P/\Delta T_{bpe})}{(\partial P/\partial T)} = \frac{K}{K_0} - \left(\frac{K_0}{K_1}\right)^3 \left(\frac{K}{K_0}\right)^3 \quad (1')(2')$$

This last relationship, particularly for an aerosol system, between vapor pressure and droplet size are represented by FIG. 1 of the drawings, in which the quantities $F$ and $f$ are expressions of the solute concentration of, respectively, bulk and droplet liquids, relative to a reference which, in the case of sea water is taken as 3.5 percent salt. The vapor pressure-curvature (size) relationships for various droplets of constant relative solute concentration $(f)$ are represented by the broken lines in FIG. 1 for values of 0.5, 1.0, 1.5, and 2.0. The vapor pressure curvature relationship for droplets of constant solute content will be in accordance with the unbroken curved lines in FIG. 1. This relationship is shown for three droplet sizes designated $K_1/K_o=0.63$, $K_1/K_o=1.0$ and $K_1/K_o=1.3$, in which $K_1$ is the curvature of the droplet at unity relative solute concentration and $K_o$ is a factor characterizing the particular solution at unity solute concentration and introduced to render the relationships expressed by the curves illustrated universally applicable to solutions. For sea water desalination in which the salinity is taken as 3.5 percent, the value of $K_o$ for sea water at ordinary temperatures is of the order of 20 reciprocal microns.

In the liquid transfer system which operates according to the method represented by FIG. 1, the energy is supplied through the generation of a disperse system, that is, by expulsion of the solution through a nozzle under pressure into a carrier gas in the case of an aerosol, and in the case of an emulsion, by compressing and expelling a solution-immiscible liquid mixture as in conventional emulsifying apparatus. The energy required to drive the transfer process is the energy stored as the surface energy of the droplets. The surface tension of a droplet results in an internal hydrostatic pressure which is given by $$P_f=2\gamma K$$

For an aerosol formed with a 100 percent efficient nozzle, this internal hydrostatic pressure will equal the hydrostatic pressure at the nozzle, $P_n$, so that the relative nozzle efficiency may be defined by $$E=P_f/P_N=2\gamma K/P_N$$

thus making it clear that higher nozzle efficiencies are achieved when aerosols of smaller droplet size are produced under conditions which, otherwise, are substantially the same or similar, with the same being true of emulsion systems and their generation.

As a dispersed droplet of any particular curvature K is brought into equilibrium in the presence of a reservoir of the solvent, the vapor pressure-curvature relationship for the droplet follows a curve such as are shown in FIG. 1. It will be apparent from this figure, that the amount of solvent transferred from a droplet of given size will be influenced by the difference between the bulk relative solute concentration F of the dispersed phase makeup and that of the product reservoir, with large differences tending to increase the amount of liquid transferred due to increased discrepancy between the vapor pressure associated with the disperse system and the vapor pressure associated with the reservoir. However, with the generation of a higher energy disperse system, e.g., a finer aerosol mist, this discrepancy between relative solute concentrations may be increased thereby substantially simplifying the apparatus required and reducing the cost thereof, and thus indicating another advantage for the generation of the smallest possible dispersed phase droplets.

When the liquid transfer method of the invention is applied for example to the desalination of sea water (3.5 percent salt), the input solution of sea water is formed into an aerosol in a carrier gas an emulsion comprising dispersed droplets in an immiscible carrier liquid. Aerosol generation may be achieved, as suggested, by expelling the sea water under pressure through a nozzle in such a way as to form fine droplets in which the energy imparted to the sea water by compression is stored as surface energy. This may be accomplished by spraying the sea water into a stream of the carrier gas, and/or by employing a moving stream of carrier gas to break up a thin stream of the droplets. Aerosol generators of this general type and useful in the invention are well known to the art, and accordingly are considered to require no additional explanation herein. Similarly, emulsions can be formed by conventional emulsification techniques in well-known apparatus of this type in which, for example, a solution such as sea water, an immiscible liquid and an emulsifying agent are extruded under pressure through an orifice.

When the disperse system is an aerosol, the droplets are carried or suspended in a carrier gas which, depending upon the application and the properties of the materials involved, may include air, a particular gas selected for a particular property and/or the saturated vapor of the solvent itself. In this latter case, particularly when the carrier gas is pure water vapor, it may be advantageous to maintain the system at a pressure less than atmospheric. A number of well-known methods are useful for vaporizing the solvent (water), for example in embodiments in which the carrier gas is essentially water vapor, the system may be evacuated and water then introduced to form a saturated vapor.

When the disperse system is an emulsion, the dispersion medium is a liquid immiscible with the solvent or dispersed liquid and in which the dispersed liquid is soluble. In the case of desalination of water, suitable liquid dispersion mediums include organic solvents, such as phenol, or low molecular weight polymers, that are substantially insoluble or, at most, poorly soluble in water and in which the solute (salt) is insoluble. The emulsion and the reservoir liquid brought into intimate contact with one another in exchange relation and may be readily separated from one another due to both the difference in specific gravity and the immiscibility of the carrier liquid (emulsion) with the reservoir liquid. The spent emulsion can be separated by conventional means such as centrifuging and the carrier liquid, preferably still saturated with the solvent (water), may be recycled through an emulsifier. Alternatively, an emulsion may be formed that is unstable and begins to separate after a short time sufficient to permit its use in the liquid transfer process.

The carrier fluid, whether it be a liquid or a gas, is saturated with the vapor of the solvent (water) and together with the dispersed droplets suspended therein, is brought into contact with a reservoir containing the solvent. In the simplest, although perhaps not the most efficient, method of sea water desalination, the disperse system of sea water droplets suspended in the water vapor saturated carrier fluid is brought into contact with a reservoir of water of, or at approximately, the desired purity. This may be accomplished in a number of different ways, the simplest (in the case of an aerosol) being to bubble the aerosol and water saturated carrier gas through a reservoir of liquid including water contained in a suitable vessel. In the case of an emulsion system, the emulsion and reservoir liquid can be counterflowed in a conventional exchange tower. The disperse system is initially in equilibrium and an unstable condition is created when the disperse system is associated (mixed) with the reservoir. The mixture tends to reach a new equilibrium and in order for the droplets of the disperse system to reach an equilibrium condition with the reservoir, water vapor is transferred from the carrier fluid to the reservoir and is replaced by water evaporated from the dispersed droplets. In this manner, pure water is transferred from the dispersed droplets to the liquid of the reservoir. When an aerosol system is employed, the gas bubbles which break the surface of the reservoir comprise an aerosol including droplets of a greater salt concentration than the input aerosol. The spent aerosol may then be passed through means for precipitating the aerosol droplets from the carrier gas which latter may then be recycled through the aerosol generator.

Figure 2:
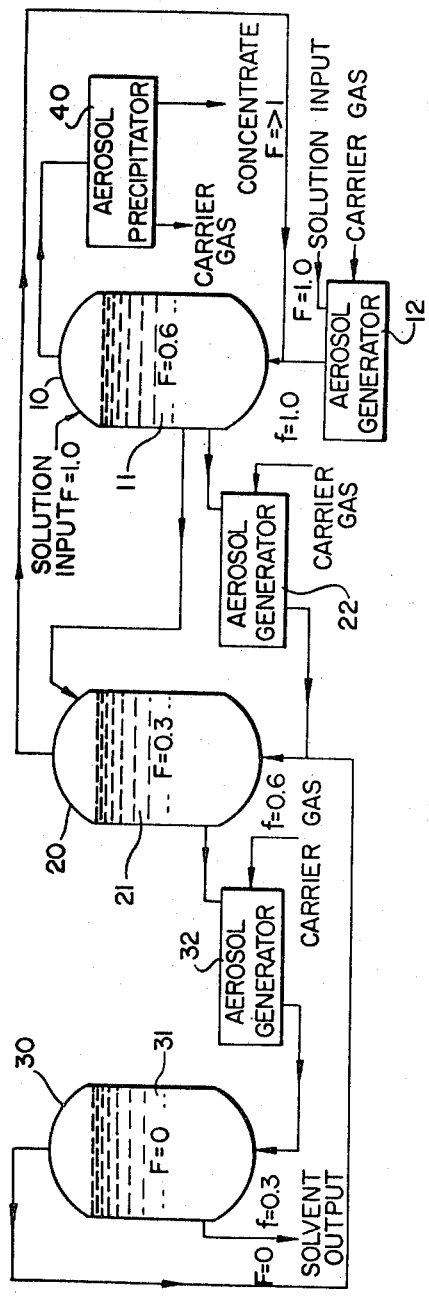
FIG. 2 is a flow diagram illustrating a method embodying the invention.

While the liquid transfer method of the invention has been described with reference to a single stage (exchange) system involving the bubbling of an aerosol-carrying gas through a reservoir of bulk liquid, other and more efficient systems are conceivable incorporating multiples of the single-stage system. A major factor influencing the complexity i.e., number of stages), and cost of the system is, as previously noted, the size of the aerosol droplets which can be generated efficiently since the permissible salinity difference between the aerosol makeup water and the reservoir to which liquid is transferred is dependent upon aerosol droplet size. With a finer mist, the salinity difference can be increased so that there is no great difference between the vapor pressures associated with the aerosol and the reservoir. It may be desirable, therefore, to employ a multistage system such as illustrated in FIG. 2, in which the aerosol for the final stage and each preceding stage except the first is formed from the product of the preceding stage, and the spent aerosol from a given stage is employed as the input aerosol for the previous stage. The multistage system illustrated in FIG. 2 includes three liquid exchange reservoirs, associated aerosol generators and means for controlling the relative salinity of the aerosol makeup water and the liquid of each reservoir so as to provide for operation at maximum efficiency. This three-stage system is embodied in apparatus comprising first, second and third liquid exchange vessels designated, respectively, 10, 20 and 30. Each of vessels 10, 20 and 30 is in the form of a closed tank or container for holding a quantity of bulk liquid designated, respectively, 11, 21 and 31. At the commencement of operation of the system to convert sea water having a relative salinity F equal to 1.0, to pure or fresh water having zero relative salinity, reservoirs 10, 20 and 30 are charged, for example, with quantities of liquids including water of relative salinity (F) of respectively, 0.6, 0.3 and 0. This may be accomplished by adding sea water to fresh water to obtain the desired relative salinities of the initial charges of liquid for the first and second reservoir. The makeup water for the aerosol input to the first stage comprises sea water which is introduced into a first aerosol generator 12 including, for example, a compressor or pump, and a nozzle, coupled with a source of the water saturated carrier gas. The carrier gas including the aerosol formed by generator 12 and spent aerosol from the second stage are introduced into vessel 10 at the lower part thereof so that the aerosol carrying gas is brought into contact with liquid 11 in the form of bubbles which travel upwardly through the liquid and break the surface thereof. It will be appreciated that the relative salinity of a reservoir may not be the same throughout the reservoir and may vary due to the addition and/or withdrawal of liquids. For this reason, the values given for relative solute concentration F are average values for each reservoir which result in an associated vapor pressure most nearly appropriate for efficient operation.

The efficiency of each stage in the system is determined by the degree to which equilibrium is attained between the aerosol and solution, and the dynamics of equilibrium are in turn influenced by such factors as thermal conductivity in the bubble, diffusion rate in the bubble and the transit time of the bubble through the reservoir of liquid. Since small bubbles will improve thermal conductivity and water vapor diffusion, the aerosol carrying gas is preferably introduced into the liquid reservoir in such a way as to produce the smallest possible bubbles. The transit time of the bubbles will depend upon bubble size and the depth of the liquid reservoir. Since a point will be reached at which extension of the transit time will result in a greater loss by diffusion of droplets into the reservoir liquid than gain from a closer approach to equilibrium, accordingly, the depth of the liquid reservoir should be designed to result in a transit time at which diffusion loss just starts to become greater than the gain due to a closer approach to equilibrium.

The aerosol and carrier gas collected within vessel 10 above the surface of liquid reservoir 11 are conducted from the vessel to an aerosol precipitator designated 40 which is designed to separate the water saturated carrier gas (which may be water vapor) from the aerosol droplets and reduce the spent aerosol droplets to bulk liquid. The vapor saturated carrier gas may be conducted from aerosol precipitator 40 to aerosol generator 12 where the gas is reused as a carrier for the initial aerosol input.

It is important that the relative salinity of both the aerosol introduced into the first liquid exchange vessel and liquid 11 in the vessel be maintained constant during the operation of the apparatus. Water transferred from the aerosol introduced into liquid reservoir 11 to the liquid will naturally reduce the relative salinity of the liquid reservoir, and accordingly provision is made for introducing into the first reservoir, water, e.g., sea water, at a relative salinity higher than that of the liquid reservoir in order to maintain the relative salinity of the liquid reservoir at the desired level.

The second and third stages of the system are basically the same as the first stage of the system described. The second stage includes an aerosol generator 22 coupled with a source of the carrier gas for supplying an aerosol at the proper relative salinity in a water saturated carrier gas to be bubbled through liquid 21 in vessel 20 where water from the aerosol droplets is transferred to liquid reservoir 21. The liquid 11 in vessel 10 is maintained at the desired level by withdrawing diluted liquid from vessel 10 as the liquid is replenished by the addition of water from the aerosol and sea water added to maintain the liquid at the desired relative salinity. The water withdrawn from vessel 10 is used as the makeup water for aerosol generator 22, and is added to vessel 20 to maintain liquid 21 therein at the desired relative salinity. The spent aerosol from the second stage is collected above the surface of liquid 21 and conducted to vessel 10 into which it is introduced together with the aerosol generated by generator 12.

The aerosol introduced into the third stage vessel 30 is produced by an aerosol generator 32 coupled with a source of the carrier gas and with vessel 20 from which it draws water to make up the aerosol for the third stage. The aerosol in a water-saturated water-carrier gas from generator 32 is passed through liquid 31 in vessel 30; and the spent aerosol and carrier gas is collected within vessel 30 above the surface of liquid 31 and conducted therefrom to vessel 20 where it is introduced along with the aerosol from generator 22 and bubbled through liquid 21. The pure water which is the output of the system is withdrawn from vessel 30 at a rate calculated to maintain liquid 31 at the desired level. Liquid 21 in vessel 20 is maintained at the desired level by withdrawing liquid therefrom to make up the aerosol produced by generator 32.

Figure 3:
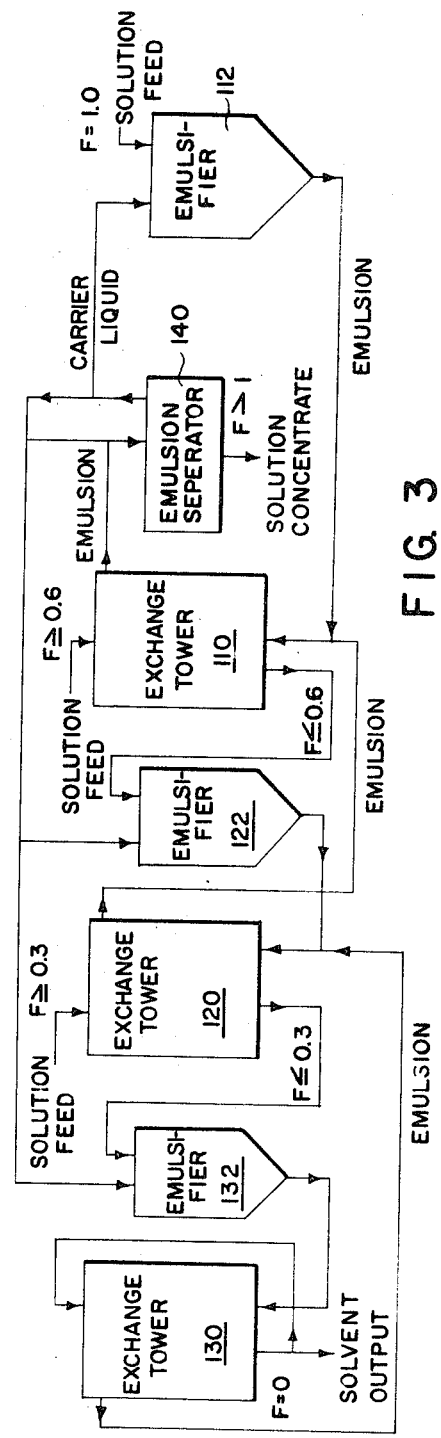
FIG. 3 is a flow diagram, similar to FIG. 2, illustrating another embodiment of the invention.

Reference is now made to FIG. 3 of the drawings wherein there is illustrated a multiple stage emulsion-desalination system embodying the invention This system is analogous to the aerosol system shown in FIG. 2 and comprises three stages including three exchange towers designated 110, 120, and 130, of a conventional type in which fluids are circulated in contacting relation for transferring a liquid from one fluid to the other. Such towers are well known in the art and include means for bringing the two fluids into intimate association and then separating the fluids after the desired transfer has occurred. One of the fluids circulated through each of the exchange towers provides the reservoir to which pure water is transferred and this fluid shown as circulated downwardly through each of towers 110, 120 and 130 is, respectively, water of relative salinity $F \gtrsim 0.6$, $F \gtrsim 0.3$ and $F=0$, as in the case of the makeup for the reservoirs in the aerosol system. Feed water of the proper salinity for towers 110 and 120 may be obtained by mixing the product of the same or succeeding stage with salt water or a higher relative salinity, e.g., $F=1.0$.

The makeup water for the emulsion input to the first stage comprises sea water ($F=1.0$) which is introduced into a first emulsifier 112 including, for example, means for bringing together a dispersion or carrier liquid, such as phenol, an emulsifying agent, e.g., a surfactant, and the sea water and extruding the mixture under pressure through an orifice. The carrier liquid for emulsifier 112 may be supplied from an external source or from a conventional emulsion separator 140 and, in the latter case, will be saturated with water.

The second and third stages of the system are basically the same as the first stage. The second stage includes an emulsifier 122 coupled with a source of the carrier liquid for supplying an emulsion including a dispersed phase of the proper relative salinity, suspended in the water-saturated carrier liquid to be circulated through exchange tower 120 in contacting exchange relation with water of relative salinity $F \gtrsim 0.3$, to transfer water from the emulsion to the solution circulated through the exchange tower. The water used for the makeup in emulsifier 122 is the water withdrawn from exchange tower 110 whereas the water circulated through exchange tower 120 is made up of the product of exchange tower 120 plus the product of exchange tower 110 and/or sea water. The makeup water for the emulsion and the water circulated through each exchange tower are adjusted to provide a minimum salinity differential throughout the tower consistent consistent with the aforementioned principles governing the most efficient liquid transfer. The spent emulsion collected from the top of second exchange tower 120 is conducted to exchange tower 110 into which it is introduced together with the emulsion produced in emulsifier 112. The dispersed solution phase of the emulsion from exchange tower 120 is at substantially the same relative salinity as the dispersed phase of the output of emulsifier 112.

The emulsion introduced into third stage exchange tower 130 is produced by an emulsifier 132 supplied with carrier liquid from emulsion separator 140 and with makeup water from exchange tower 120. The emulsion from emulsifier 132 is circulated through exchange tower 130 to transfer water from the emulsion to water at relative salinity $F=0$, and then is reintroduced into exchange tower 120 together with emulsion from emulsifier 122 at substantially the same relative salinity as the latter. The pure water (relative salinity $F=0$), which is the product of the third stage system, is withdrawn from exchange tower 130 and a portion of this water is recirculated through the exchange tower to provide the third stage reservoir to which fresh water is transferred.

The method and apparatus have been shown and described as intended primarily to produce a pure solvent, i.e., fresh water, together with a secondary product or byproduct in the form of a concentrated solution of the solute and suspended matter, i.e., salts, minerals, etc. It may be both advisable and economically feasible under certain circumstances, for example, when the input sea water requires substantial or expensive preparation, e.g., filtration and the like, before it can be introduced into the system, to add one or more additional stages to the system before the first stage. These additional stages would be provided for the purpose of further extracting solvent from the dispersed droplets prior to their precipitation or separation. These additional stages would be essentially the same as the stages shown and would include reservoirs, or exchange towers in which the reservoir liquid is, of increasing relative solute concentration (e.g., greater than 1), and where appropriate vessels for the reservoirs, associated aerosol generators, and emulsifiers. A system comprising additional liquid exchange stages (perhaps without the second and third stages shown) of progressively increasing relative solute concentration would be employed if the primary product were to be the solute rather than the solvent, with the system designed primarily for achieving the maximum reduction in solvent content of the dispersed droplets in order to produce the highest possible concentration of the solute and/or suspended material.

Other and perhaps more efficient systems and apparatus for bringing the aerosol into association with a liquid reservoir to transfer the liquid from the aerosol to the reservoir are conceivable and are considered to fall within the scope of the present invention. Such systems for transferring a liquid from an aerosol to a reservoir of the liquid may include, for example, provision for creating a reservoir in the form of droplets rather than a bulk liquid as shown, and bringing the aerosol in its liquid saturated carrier gas into association with the droplets of the reservoir in order to transfer the liquid from the aerosol to the reservoir droplets. This may be accomplished, for example, by passing the reservoir droplets through a stream of the aerosol suspended in the water vapor saturated carrier gas. Other modifications may include operating such a system at reduced pressure and thereby increase the efficiency of aerosol generation, make possible (particularly in the case of water) the use of the saturated vapor of the solvent as the carrier gas and increase the efficiency of flow of the various liquid, vapor and gas phases employed in the system.

Whatever the particular form and construction of the system, its greatest advantages lie in the fact that the energy initially committed to effect solvent transfer is mechanical rather than heat; and the initial energy committed in small as compared with the initial energy input of conventional and existing liquid transfer systems.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of transferring a volatile liquid having a significant vapor pressure from a solution including said volatile liquid and a less volatile constituent, said method comprising:
   providing at least one liquid body of said volatile liquid in which said less volatile constituent is at a lower concentration than it is in said solution;
   forming a disperse system comprising dispersed liquid droplets of said solution suspended in a carrier fluid immiscible with said volatile liquid and in which said volatile liquid shows limited solubility, said carrier fluid being saturated with said volatile liquid, said droplets having a curvature that is large relative to the curvature of said liquid body at an interface to be formed between said liquid body and said carrier fluid so that the vapor pressure of said droplets is higher than that of said liquid body; and
   introducing said disperse system into intimate association with said liquid body to form said interface and to create an unstable condition as a result of said vapor pressure differential so as to reduce the vapor pressure of said droplets toward equilibrium with the vapor pressure of said liquid body by transferring at least some of said volatile liquid from said dispersed droplets to said carrier fluid and then to said liquid body.

2. The method of claim 1 in which said carrier fluid is a gas and said disperse system is an aerosol.

3. The method of claim 1 wherein said carrier fluid is a liquid and said disperse system is an emulsion.

4. The method of claim 1 further including the steps of providing at least one second liquid body of said volatile liquid in which the concentration of said less volatile constituent is lower than the concentration thereof in the first-mentioned liquid body;
   a second disperse system comprising minute droplets of said liquid of said first-mentioned liquid body suspended in said carrier fluid, said droplets of said second disperse system having a curvature that is large relative to the curvature of said second body at a second interface to be formed between said second body and said carrier fluid of said second disperse system; and
   introducing said second disperse system into intimate association with said liquid of said second body to form said second interface and to transfer a portion of said volatile liquid, as vapor, from said dispersed droplets of said second disperse system to the carrier fluid thereof and then to said second body.

5. The method of claim 4 wherein said second disperse system is collected following transfer of said volatile liquid therefrom to said second liquid body and is introduced together with the first-mentioned disperse system into intimate association with said first-mentioned liquid body.

6. The method of claim 4 wherein said carrier fluid is a liquid immiscible with said volatile liquid and saturated therewith and said disperse systems are emulsions.

7. The method of claim 4 wherein said carrier fluid is a gas saturated with said volatile liquid and said disperse systems are aerosols.

8. The method of claim 7 wherein liquid including said less volatile constituent is withdrawn as liquid from said first-mentioned liquid body and is introduced into said second liquid body to maintain the concentration of said less volatile constituent in said second liquid body substantially constant.

9. The liquid transfer method of claim 1 in which said volatile liquid is a solvent and said less volatile substance includes a solute which exhibits no significant vapor pressure at temperatures at which said liquid exhibits a significant vapor pressure, dissolved in said solvent.

10. The liquid transfer method of claim 9 in which said solvent is water and said solute is a salt.

11. The liquid transfer method of claim 9 in which said carrier fluid consists substantially of the saturated vapor of said solvent.

12. The liquid transfer method of claim 1 in which said liquid body is provided within a system from which substantially all gas except the vapor of said volatile liquid has been removed, said system is maintained at reduced pressure and said saturated vapor of said volatile liquid is formed by introducing said volatile liquid into said system.

13. The liquid transfer method of claim 1 wherein said carrier fluid is a liquid in which said volatile liquid is soluble and said less volatile constituent is substantially insoluble.

14. The liquid transfer method of claim 13 wherein said volatile liquid is water and said less volatile constituent is a salt.

15. The liquid transfer method of claim 14 wherein said carrier liquid is an organic compound substantially insoluble in said volatile liquid.

16. The liquid transfer method of claim 14 wherein said carrier liquid is phenol.

* * * * *